United States Patent
Roozenboom (10) Patent No.: US 9,291,097 B2
(45) Date of Patent: Mar. 22, 2016

(54) COOLING MODULE FOR ELECTRONIC ENGINE COMPONENTS

(71) Applicant: Caterpillar Inc., Peoria, IL (US)

(72) Inventor: Stephan Roozenboom, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 501 days.

(21) Appl. No.: 13/909,647

(22) Filed: Jun. 4, 2013

(65) Prior Publication Data

US 2014/0352917 A1 Dec. 4, 2014

(51) Int. Cl.
*F01P 1/06* (2006.01)
*F02B 77/11* (2006.01)
*F01P 3/20* (2006.01)
*F02M 25/07* (2006.01)
*G01F 1/44* (2006.01)

(52) U.S. Cl.
CPC . *F02B 77/11* (2013.01); *F01P 3/20* (2013.01); *F02M 25/0707* (2013.01); *F02M 25/0726* (2013.01); *F02M 25/0754* (2013.01); *F01P 2050/30* (2013.01); *F02M 2025/0757* (2013.01); *G01F 1/44* (2013.01); *Y10T 29/49366* (2015.01)

(58) Field of Classification Search
CPC ...... F02B 77/11; Y10T 29/49366; F01P 3/20; F01P 2050/30; F02M 25/0707; F02M 25/0726; F02M 25/0754; F02M 2025/0757; G01F 1/44
USPC ...................................................... 123/41.31
See application file for complete search history.

(56) References Cited

U.S. PATENT DOCUMENTS

| 5,619,956 | A  | * | 4/1997  | Koziara et al. .............. 123/41.31 |
| 5,626,105 | A  | * | 5/1997  | Locke et al. ....................... 123/3 |
| 6,415,757 | B1 |   | 7/2002  | Glovatsky |
| 7,322,192 | B2 |   | 1/2008  | Sheidler et al. |
| 7,921,830 | B2 |   | 4/2011  | Schneider et al. |
| 8,176,803 | B1 |   | 5/2012  | Willett et al. |
| 2002/0104490 | A1 | * | 8/2002  | Itakura et al. .............. 123/41.31 |
| 2004/0206313 | A1 | * | 10/2004 | Schondelmaier et al. . 123/41.31 |
| 2006/0272605 | A1 | * | 12/2006 | Wright et al. .......... 123/142.5 E |

(Continued)

FOREIGN PATENT DOCUMENTS

| DE | 102006058748 A1 | 6/2008 |
| JP |        8135479 A | 5/1996 |
| JP |     2011131689 A | 7/2011 |

*Primary Examiner* — Marguerite McMahon
(74) *Attorney, Agent, or Firm* — Miller, Matthias & Hull LLP (57) ABSTRACT

A multi-paneled cooling module adapted to be mounted to an engine exterior protects electronic components such as sensors and associated wiring from heat loads of the engine and/or other heat generating engine devices. The module is formed of wall and ceiling panels having a relatively high thermal conductivity, such as aluminum. The cooling module, which includes strategically situated integral coolant passages within several of its panels, is adapted to protect all enclosed electronic components, including electronic pressure sensors, an EGR valve, and all associated wiring and wiring harnesses. For example, the sensors, harnesses, and valve components associated with and proximal to an EGR venturi may be fully protected from overheating, in spite of exposure of those components to massive heat loads generated by the venturi. Finally, the cooling module may incorporate additional cooling accommodation for hydraulic oil cooling if, for example, the EGR valve is hydraulically actuated.

20 Claims, 6 Drawing Sheets

(56) References Cited

U.S. PATENT DOCUMENTS

| | | | |
|---|---|---|---|
| 2007/0184320 A1* | 8/2007 | Domen | 429/26 |
| 2009/0020081 A1* | 1/2009 | Claypole et al. | 123/41.31 |
| 2010/0154758 A1 | 6/2010 | Schneider et al. | |
| 2010/0170455 A1* | 7/2010 | Feldhaus et al. | 123/41.08 |
| 2014/0174120 A1* | 6/2014 | Schaefer et al. | 62/518 |
| 2014/0211486 A1* | 7/2014 | Rodriguez | 362/373 |

* cited by examiner

COOLING MODULE FOR ELECTRONIC ENGINE COMPONENTS

TECHNICAL FIELD

This disclosure relates generally to a system and method for protecting electronic components attached to engines subjected to deleteriously high temperatures and heat loads. More particularly, the disclosure relates to liquid cooled structural modules adapted to enshroud and shield such components from heat.

BACKGROUND

Exhaust emissions of internal combustion engines, particularly diesel engines, contain regulated exhaust constituents, mainly nitrogen oxides (NOX) and soot particles. Such emissions are limited by federal laws and regulations in most countries. One common way to reduce nitrogen oxide emissions is to use an exhaust gas recirculation (EGR) system wherein a part of the exhaust gas is purposely returned to the combustion chamber. This action leads to lower peak combustion temperatures, which in turn reduces formation of NOX.

The typical modern diesel EGR system employs a so-called high pressure loop (HPL) system wherein a portion of engine exhaust is removed upstream of a turbine of a turbocharger. A pressure differential between exhaust and intake manifolds may be maintained to be positive in order to provide adequate EGR flow upon demand; the pressure differential may be controlled by various means, such as a variable geometry turbine or a backpressure valve. In some embodiments, the exhaust portion flows through an EGR cooler provided with a coolant medium, such as engine coolant or ambient air. From the cooler, the EGR flows through an EGR conduit into an EGR venturi tube (herein called a venturi) adapted to provide control feedback for managing the EGR flow rate. An EGR control valve directly controls the EGR flow rate, as the recirculated exhaust gas mixes with so-called cooled charge air before being inducted into the engine via the intake manifold.

In a heavy duty diesel engine environment, the EGR venturi can heat up to temperatures beyond designed operational limits of various electronic pressure sensors and associated wiring, particularly when the engine is operated at higher loads. Many solutions have been offered, including one provided in U.S. Pat. No. 7,921,830, which discloses a venturi containing liquid cooled internal chambers to manage operating temperatures within the physical venturi structure. The solution offered is relatively expensive, and may not be as effective as desired. A second solution is offered in U.S. Pat. No. 6,415,757, which discloses a double-walled chamber (FIG. 5) adapted to enclose temperature sensitive electronics, and to circulate cooling fluid through the chamber. A simpler and more conveniently assembled solution is desired.

SUMMARY OF THE DISCLOSURE

In one aspect of the disclosure, a cooling module protects from overheating at least one electronic engine component situated proximally to the engine. The module, adapted to be secured to the exterior of an engine, includes a plurality of thermally conductive panels, and at least one panel includes an integral tubular coolant passage. The panels are joined together to form an enclosure defined by interior surfaces of the panels. The joined panels collectively define individual walls and a ceiling of the module to form a plurality of enclosing side walls and an enclosing ceiling. A floor and at least one side wall are substantially open to avoid the trapping of heat. The at least one component is substantially thermally shielded by the enclosing side walls and ceiling from engine generated heat.

In a further aspect of the disclosure, at least two enclosing side panels of the cooling module define left and right module walls that include hydraulic oil passages. In this additional aspect, the at least one component is substantially thermally protected from engine generated heat via both active cooling of, and passive heat radiation from, the cooling module.

In yet another aspect of the disclosure, a method of making a cooling module includes providing a plurality of thermally conductive panels configured to include a plurality of tubular coolant passages, and joining the panels together to form an enclosure defined by interior surfaces of the panels. The panels define individual walls and a ceiling, and include a substantially open floor and at least one substantially open side wall. At least one engine component is substantially thermally shielded by the cooling module from engine generated heat.

DETAILED DESCRIPTION

Figure 1:
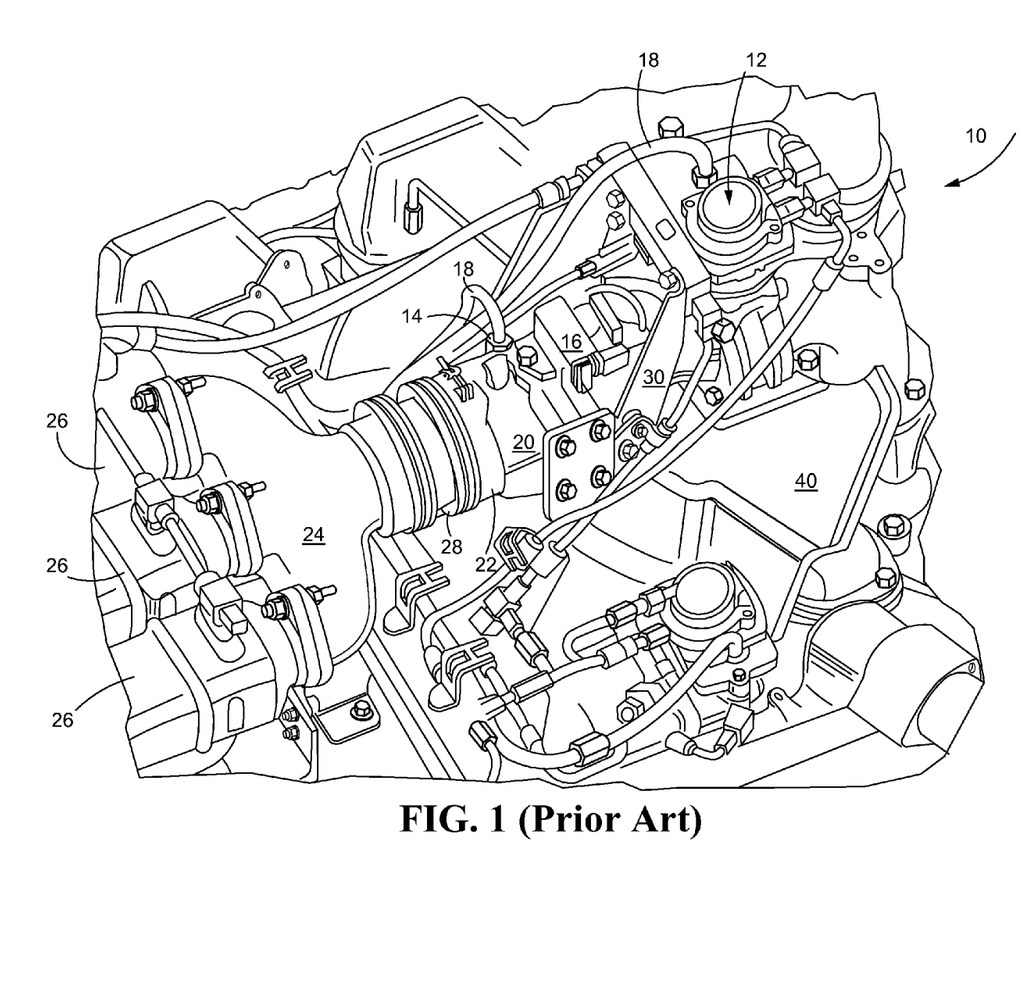
FIG. 1 is a rear to front perspective view of a portion of an upper surface of an engine, depicting the environment of a prior art EGR venturi, shown supported by a bracket, and including a view of the venturi inlet connected to three EGR coolers via a converging manifold.

Referring initially to FIG. 1, an upper surface of an engine 10 includes an EGR valve 12, along with an absolute pressure sensor 14 and a differential or so-called Delta pressure sensor 16. Each of the sensors 14, 16 may have associated wiring and/or wiring harnesses 18. An EGR venturi 20 is generally associated with considerable heat output due to the high temperature exhaust gases flowing therethrough. The heat output of the EGR venturi 20 is known to be potentially deleterious to electronic components and associated wiring, including harnesses, attached thereto. A venturi inlet 22 may be adapted to receive high-pressure exhaust gases through a venturi header 24, also variously called a splitter, which may receive gases from a plurality of EGR coolers 26 (three are shown fragmentarily) situated upstream of the venturi 20.

A cooler-to-venturi coupling 28 assures airtight EGR gas flows into the venturi 20 from the coolers 26. A prior art bracket 30 has typically been employed to support the venturi 20, the bracket 30 being anchored to, and supported by, an air intake manifold (not shown). A thermal shield 40 has been used traditionally to attenuate and/or mitigate radiant engine heat, as is well known by those skilled in the art. However, the thermal shield 40 may insufficiently shield the electronic components and associated wiring attached thereto.

Figure 2:
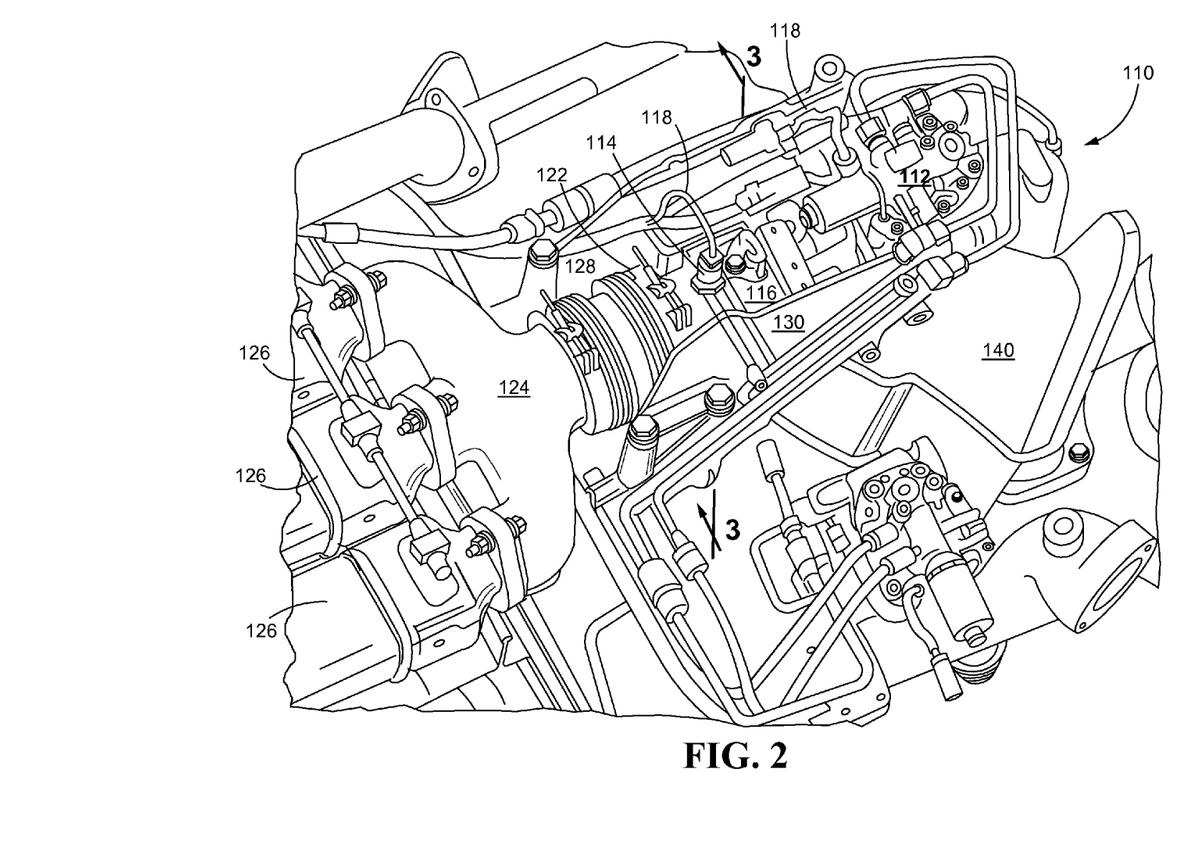
FIG. 2 is also a rear to front perspective view of an upper surface portion of an engine similar to that shown in FIG. 1, but without the bracket, and providing a fragmentary view of the disclosed cooling module (depicted only partially above the venturi), shown secured to an engine manifold and adapted to support the venturi on a pair of spaced legs.

Referring now to FIG. 2, an exemplary embodiment of a cooling module of the present invention is disclosed. Thus, as shown in FIG. 2, an upper surface of an engine 110 may also support an EGR valve assembly 112 along with an absolute pressure sensor 114, and a Delta pressure sensor 116. Associated wiring and/or wiring harnesses 118 may be connected to the sensors 114, 116. The sensors may be adapted to electronically monitor the rate of EGR gas flow through the venturi 120. The venturi 120 may include a venturi inlet 122, which inputs from a splitter 124, situated downstream of three EGR coolers 126. A cooler-to-venturi coupling 128 may be adapted to couple the splitter 124 to the venturi inlet 122 in a gas tight manner to facilitate high pressure EGR gas flows into the venturi 120. Finally, a thermal shield 140 may be employed to mitigate transfer of radiant heat from the engine surface to electronic components and engine control devices situated above the engine 110.

In lieu of the bracket 30 illustrated in FIG. 1, however, a cooling module 130 (shown only fragmentarily), also variously referred to as a chiller by those skilled in the art, may be employed to both support the physical venturi 120, as well as to provide both active, including conductive and convective, as well as passive, i.e., radiative, cooling capabilities to avoid exposing the electronic components, such as the pressure sensors 114 and 116 and the EGR valve assembly 112 that may be situated above the engine 110, to high heat loads.

Figure 3:
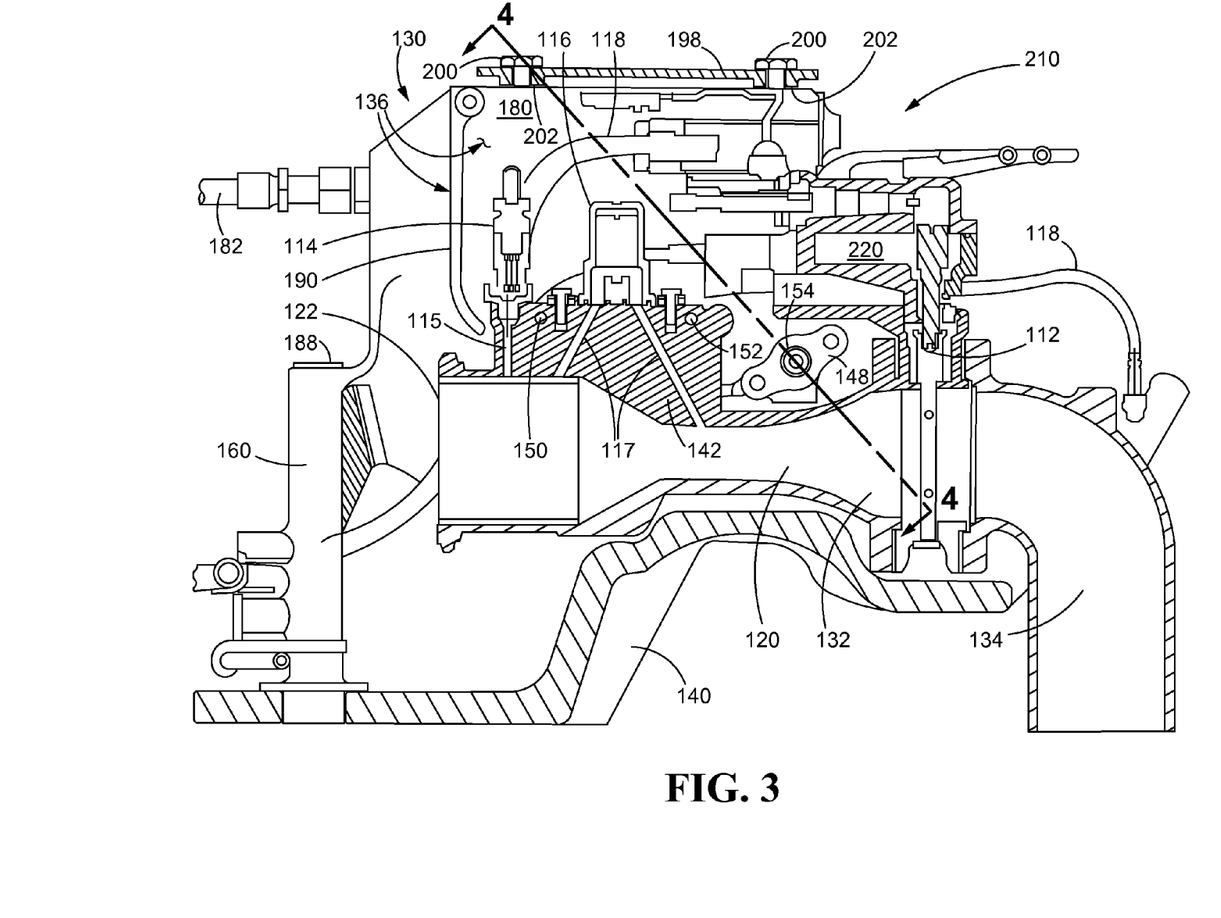
FIG. 3 is a cross-sectional view of the entire cooling module and the venturi, as would be viewed along lines 3-3 of FIG. 2.

Referring now also to FIG. 3, in addition to the above-described inlet 122, situated at the front of the cooling module 130, the venturi 120 has an outlet 132. From the outlet 132, EGR gases flow into a venturi outlet conduit 134 and ultimately back into an intake manifold (not shown). In FIG. 3, more of the thermal shield 140 is shown as it extends immediately above the engine 110 and below the venturi 120.

Positioned above the venturi 120, the disclosed cooling module 130 is shown in cross-section. The cooling module 130 has the form of a multi-paneled enclosure, generally defining substantially enclosed sides and a top, but having its front side and its bottom being substantially open. The panels 136 are shown generally in FIG. 3 as the top and sides of the cooling module 130. Immediately above the venturi 120 is positioned a sensor mounting block 142 in which sensing passages 115 and 117, respectively, are drilled to permit EGR gas pressures to be transmitted to pressure sensors 114 and 116. In the described configuration, the mounting block 142 is a physical part of the venturi casting, although this disclosure is not limited to such a construction. In FIG. 3, the sensors 114 and 116 are shown to be secured directly to the mounting block 142.

The mounting block 142 may be positioned to support the sensors 114, 116 inside of the enclosure panels 136 (e.g. 180 and 190) of the cooling module 130. Water coolant passages 150 and 152 (shown in cross-section only) may run through the upper portion of the mounting block 142, i.e., just below the pressure sensors 114, 116, to enhance cooling effect for protection of the sensors 114, 116. Mounted to the venturi outlet 132 and positioned forwardly of the mounting block 142, the EGR valve assembly 112 may also be supported within the paneled enclosure of the cooling module 130.

Thus, the EGR valve assembly 112 and its associated electro-hydraulic actuator 220 may be supported, so as to extend through the substantially open front wall 210 of the cooling module 130. Extending laterally through a floor portion 148 of the cooling module 130 may be a coolant water passage 154, strategically positioned below the EGR valve assembly 112 to effectively cool the valve assembly 112.

Figure 4:
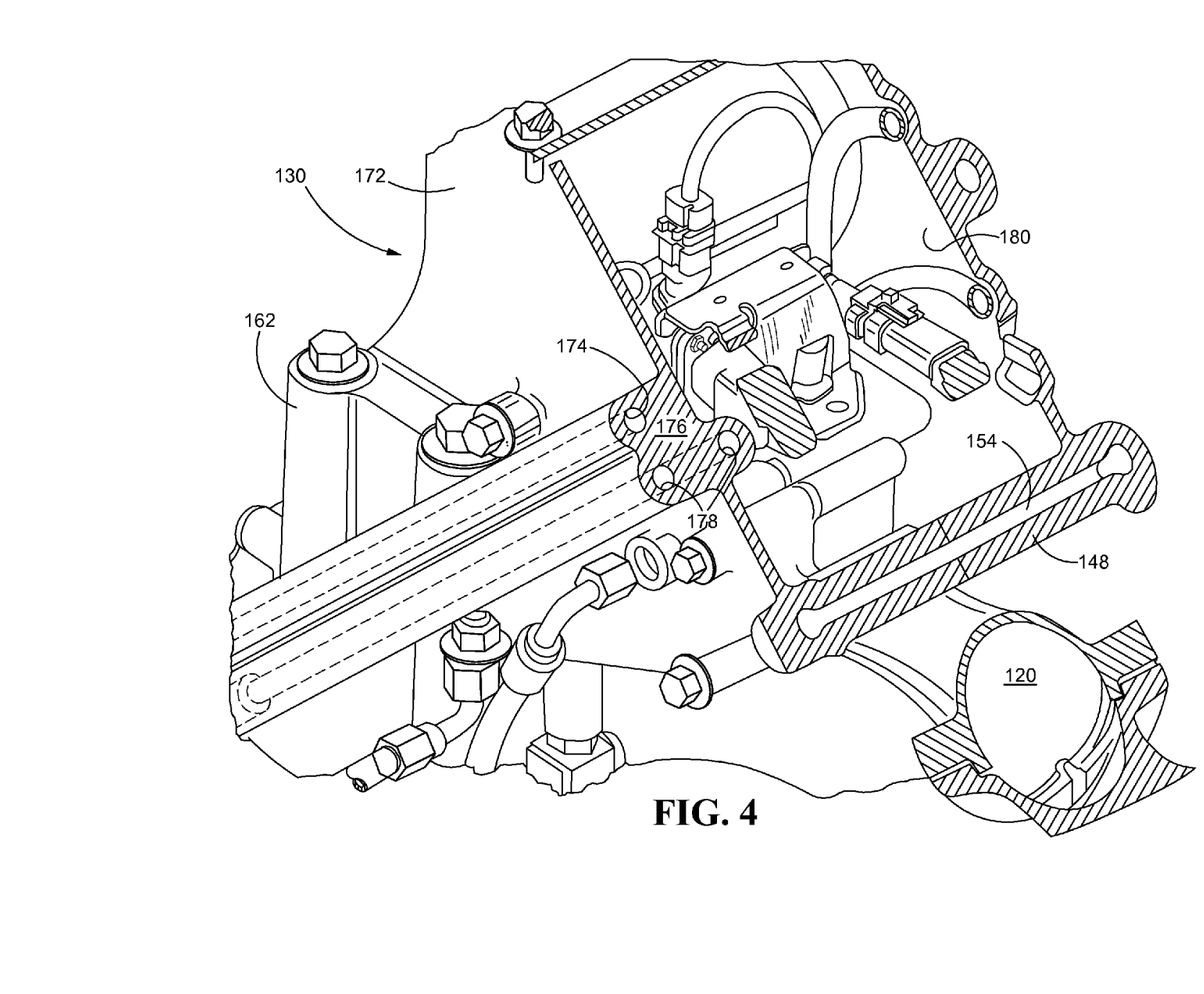
FIG. 4 is an enlarged perspective view of the cooling module of FIG. 3, with an upper portion of the cooling module removed to permit a view along lines 4-4 of FIG. 3 to reveal cooling passages within the module walls and floor portion.
Figure 5:
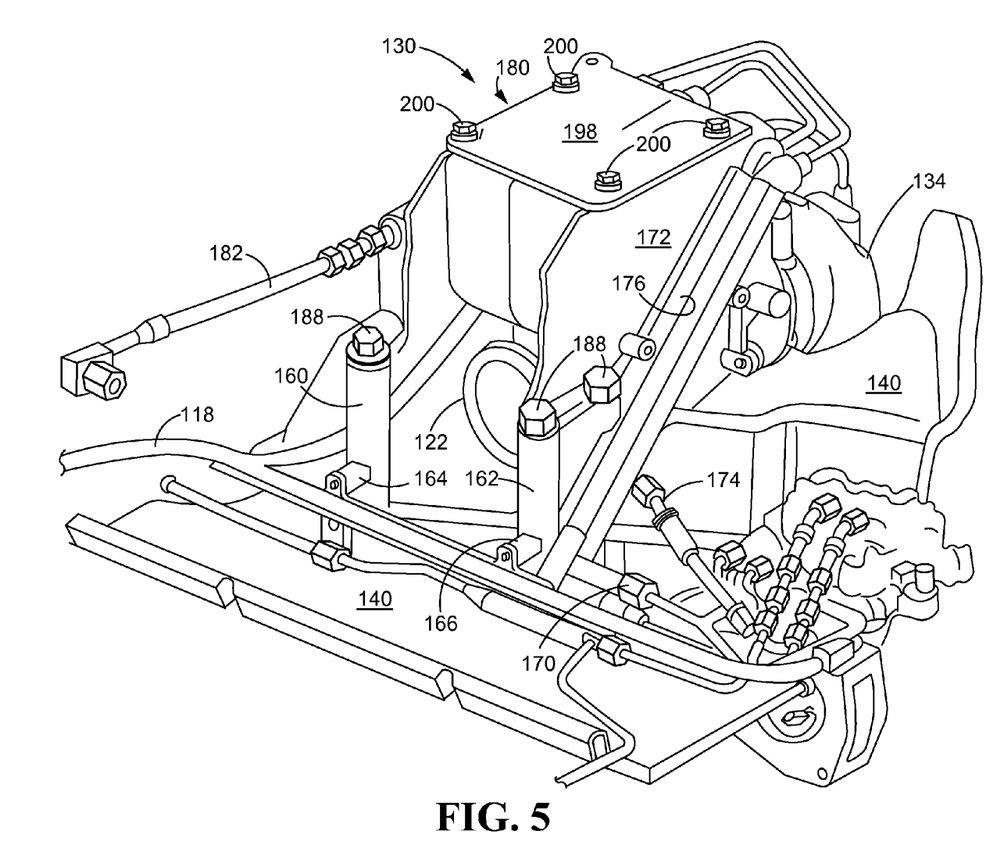
FIG. 5 is a perspective view of the entire cooling module of FIG. 3.

Referring now also to FIGS. 4 and 5, a pair of left and right cooling module support legs 160, 162 may be offset from the cooling module 130, as shown. The legs 160, 162 may include pairs of structural connectors 164, 166, respectively, to accommodate routing of wiring harnesses 118, as particularly shown in FIG. 5. Also, shown in FIG. 5, at least one coolant coupling connector 170 and at least one coolant line 174, 182 may be positioned to accommodate flows of coolant into each of the right and left sidewalls 172 and 180 of the cooling module 130. For this purpose, the walls 172 and 180 may be formed of a material having a relatively high heat transfer coefficient, such as an aluminum metal alloy to facilitate expeditious transfer of passive or radiant heat loads. The walls 172, 180 may contain integral interior coolant passages (not shown) for providing active cooling. Such interior wall coolant passages may be formed into the walls by an aluminum casting process, as may be appreciated by those skilled in the art.

Referring now specifically to FIG. 4, a perspective view of the laterally extending water coolant passage 154 more clearly reveals that the passage 154 passes through the floor portion 148, and runs between the left and right walls 180, 172, respectively, of the cooling module 130.

Figure 6:
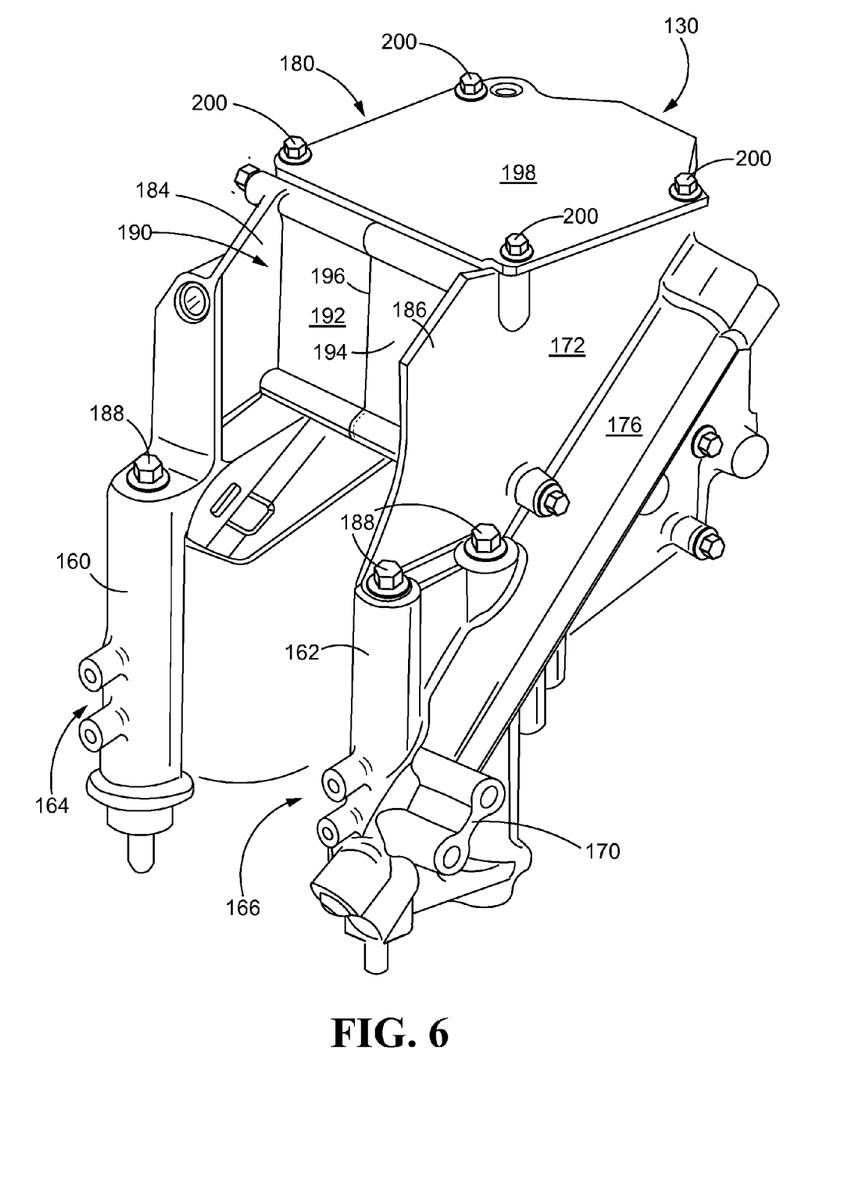
FIG. 6 is a similar perspective view of the entire cooling module, but depicted as a standalone unit just prior to installation, without the engine connections of FIG. 5, and with the support legs of the module disconnected from the engine manifold.

Referring now also to FIG. 6, the multi-paneled cooling module 130 has its several panels 136 joined together to form right and left sidewalls 172, 180, respectively, and a rear wall 190. It will be appreciated that the sidewalls 172, 180, the rear wall 190, and the top wall or lid 198 may be joined together to form a paneled enclosure adapted to substantially protect enclosed electrical components, including the described EGR valve assembly 112, pressure sensors 116, 116, and associated wiring harnesses 118, from heat damage, particularly when active cooling is provided by integral coolant passages strategically incorporated to accommodate coolant flows within the described panels 136.

As may best be seen in FIGS. 4 and 6, a multiplex conduit 176 may be integrated into the right wall 172 as shown for accommodating cooling of hydraulic passages 178 that extend to an electro-hydraulic EGR valve actuator 220. For such purpose, the coolant line 174 runs parallel and proximally to the pair of hydraulic passages 178 (FIG. 4) within the same panel 136 (e.g., right wall 172 as shown). The EGR valve actuator 220 may alternatively be completely electronically actuated, in which case the hydraulic multiplex conduit 176 could be modified and/or adapted to cool an electric harness instead.

As described, such multiplex conduit may be cast into the aluminum panels 136 (e.g., right wall 172, as shown) with integral passages machined into the cast panels. Other materials, besides aluminum, may be utilized for actual fabrication of the panels 136. In addition, other means may be employed to form or incorporate the described conduit features into the panels, such as, by way of example, inserts that may be cast into the panels to avoid subsequent machining operations, such as drilling.

For accommodating the offset support legs 160, 162 of the cooling module 130, an extension bracket 184, 186 may be formed as integral extensions of each of the right and left walls 172, 180, respectively. The result is a cooling module 130 that may be effectively cantilevered over the EGR venturi 120 by the support legs 160, 162, as best depicted in FIG. 3. Bolts 188 may be vertically inserted through the support legs 160, 162 to secure the legs to an intake manifold. Alternatively, other means, for example welding, may be employed for securement of the legs 160, 162 to the manifold.

The rear wall 190 (FIG. 3) may be vertically split as shown in FIG. 6 into left and right halves 192, 194, respectively, thus defining a vertical joint line 196 of a resultant bifurcated rear wall 190. Having the cooling module 130 split into left and right halves may better facilitate its installation over the above-described electronic components. The lid 198 may be adapted to secure the left and right halves together by bolts 200 (FIGS. 5 and 6). Although the cooling module 130 is depicted herein as being split into left and right halves in a rear-to-front orientation, other embodiments are envisioned herein, including a laterally oriented split, for example, with the split extending medially through the centers of right wall 172 and left walls 180.

The lid 198 may be spaced approximately 4 to 10 mm above the sidewalls 172, 180 and rear wall 190 to avoid trapping heated air. As best seen in FIG. 3, mounting bosses 202 at the bottom of the lid 198 at each bolt 200 may be configured to provide an air gap 204 under the lid 198 which may, along with the open front wall 210, facilitate movement of ambient air for convective transfer of heat from within the module panels 136.

Finally, the disclosure of the cooling module 130 has contained only descriptions of the panels 136 as separately formed. However, the cooling module 130 may be envisioned in alternative embodiments, for example, formed with all panels 136 as a one-piece structure. Such a one-piece cooling module 130 could be formed by casting, stamping, or via other means, all within the scope of this disclosure.

INDUSTRIAL APPLICABILITY

The disclosed cooling module 130 may provide protection of electronic components from damage resulting from engine heat in a variety of machines, including milling machines, excavation machines, haulers, and electric power generators, among many others.

The disclosed cooling module 130 may have a generally box-shaped structure as shown and described, including the generally flat panels 136, as also described herein. Alternatively, however, the module 130 may be configured to have other shapes, with the panels having other shapes, such as curved, hexagonal, etc., and yet fall within the scope of this disclosure.

The various walls of the cooling module 130, including the right wall 172, left wall 180, rear wall 190, top wall or lid 198, and front wall 210, cooperatively work together to keep radiative heat out of the interior of the cooling module 130. On the other hand, conductive heat loads are passed directly from the walls into the integral coolant water passages, including coolant water passage 150, 152, and 154 to be carried away from the cooling module 130. Finally, convective heat loads are adapted to be moved away from the cooling module 130 via the air gap 202 under the top wall or lid 198 as described, as well as via the open front wall 210.

In operation, the cooling module 130 may be effective to reduce temperatures of engine mounted electronic components even when subjected to engine heat loads exceeding 700° F. Ambient air will generally rise from engine and thermal shield areas. As the air passes through and within the cooling module 130, the air will carry away heat convectively from the panels 136. The as-described coolant water will pass through the panels 136 to conductively carry away heat, while the temperature differential between the panel walls and the ambient air will generate radiative heat transfers away from the module 130.

A method of cooling an electronic module situated above an EGR venturi by forming an exterior engine-mounted cooling module 130 may include providing a plurality of thermally conductive panels, and joining the panels together to form an enclosure defined by cooled interior surfaces of the panels for providing active cooling by conduction of heat away from the interior of the module. As such, the panels may define individual walls and a ceiling.

The method may further include providing a substantially open floor and at least one substantially open front wall for providing convective movement of heat out of the interior of the module, and configuring the cooling module to include a plurality of integral coolant passages strategically arranged to pass through the panels, both within the side walls and the floor of the module. Such cooling module structure may also be adapted to thermally shield at least one engine component from a radiative heat generating engine device and/or from conductive, convective, and radiative engine generated heat loads.

What is claimed is:

1. A cooling module adapted to be secured to an engine exterior to protect at least one electronic component situated proximally to the engine from overheating, the cooling module comprising:
   a plurality of thermally conductive panels, at least one including an integral tubular coolant passage, the panels being joined together to form an enclosure defined by interior surfaces of the panels, the panels defining individual walls and a ceiling;
   wherein the joined panels form a plurality of enclosing side walls and an enclosing ceiling, wherein a floor and at least one side wall of the enclosure are substantially open; and
   wherein the cooling module is configured to remove engine-generated conductive and convective heat, and to reflect engine-generated radiative heat, away from at least one electronic component via the enclosing side walls and ceiling of the cooling module.

2. The cooling module of claim 1, wherein the panels are formed of metal having a heat transfer coefficient greater than that of steel, and wherein the cooling module includes at least one cantilevered support leg.

3. The cooling module of claim 2, wherein the panels have internal coolant passages and are formed of cast aluminum.

4. The cooling module of claim 2, wherein the module includes a pair of support legs mountable to an engine manifold, each leg including a bracket adapted to join the legs to the cooling module.

5. The cooling module of claim 4, wherein the module is also adapted to protect a wiring harness attached to the component, and wherein the interior of at least one of the panels includes a clip for attachment of the harness and a tubular coolant line extending along the harness.

6. The cooling module of claim 5, wherein the module is formed in two half portions to facilitate assembly over a heat generating engine device attached to the engine, and wherein the legs are vertically offset from the cooling module when mounted.

7. The cooling module of claim 6, wherein the module has a bifurcated rear wall, and the half portions comprise right and left module side walls, respectively.

8. The cooling module of claim 1, further comprising an open floor having a floor portion extending between right and left module walls, the floor portion incorporating a coolant passage therethrough.

9. The cooling module of claim 8, further comprising the coolant passage extending laterally between the left and right module walls.

10. The cooling module of claim 1, wherein the walls and ceiling are defined by a single-panel thickness from inside of the enclosure to the exterior thereof.

11. A cooling module adapted to be secured to an engine exterior to protect from overheating at least one electronic component situated proximally to the engine from a heat generating engine device attached to the engine, comprising:
- a plurality of thermally conductive panels, at least one including an integral tubular coolant passage, the panels being joined together to form an enclosure defined by interior surfaces of the panels, the panels defining individual walls and a ceiling;
- wherein the joined panels form a plurality of enclosing side walls and an enclosing ceiling, wherein a floor and at least one side wall are substantially open;
- wherein at least two enclosing side panels define left and right module walls, and wherein the left and right module walls include multiplex conduit passages; and
- wherein the at least one component can be substantially thermally shielded by the enclosing side walls and ceiling from engine generated heat via both active cooling and passive heat radiation from the cooling module.

12. The cooling module of claim 11, wherein the panels are formed of metal having a heat transfer coefficient greater than that of steel, and wherein the cooling module includes at least one cantilevered support leg.

13. The cooling module of claim 12, wherein the panels have internal coolant passages and are formed of cast aluminum.

14. The cooling module of claim 12, wherein the module includes a pair of support legs mountable to an engine manifold, each leg including a bracket adapted to join the legs to the cooling module.

15. The cooling module of claim 11, wherein the module is also adapted to protect a wiring harness attached to the component, and wherein the interior of at least one of the panels includes a clip for attachment of the harness and a tubular coolant line extending along the harness.

16. The cooling module of claim 11, wherein the module is formed in two half portions to facilitate assembly over a heat generating engine device attached to the engine, and wherein the legs are vertically offset from the cooling module when mounted.

17. The cooling module of claim 11, wherein the at least one thermally conductive panel comprises a multiplex conduit having at least one integral tubular hydraulic passage and the at least one integral tubular coolant passage, and wherein the integral tubular coolant passage runs parallel and proximally to the integral tubular hydraulic passage within the at least one thermally conductive panel.

18. The cooling module of claim 11, further comprising an open floor having a floor portion extending between right and left module walls, the floor portion incorporating a coolant passage therethrough extending laterally between the left and right module walls.

19. The cooling module of claim 11, wherein the walls and ceiling are defined by a single-panel thickness from interior of the enclosure to the exterior.

20. A method of cooling an electronic module situated above an EGR venturi by forming an exterior engine-mounted cooling module, comprising:
- providing a plurality of thermally conductive panels configured to include a plurality of tubular coolant passages for providing active cooling by conduction of heat away from the interior of the module;
- joining the panels together to form an enclosure defined by interior surfaces of the panels, such that the panels define individual walls and a ceiling;
- providing a substantially open floor and at least one substantially open side wall for providing convective movement of heat out of the interior of the module;
- wherein at least one engine component can be thermally shielded by the panels of the cooling module from engine generated radiative heat.

* * * * *